(12) United States Patent
Tai

(10) Patent No.: US 6,361,698 B1
(45) Date of Patent: Mar. 26, 2002

(54) INDUSTRIAL LAGOON TREATMENT

(76) Inventor: Paul Ling Tai, 421 Glazier Rd., Chelsea, MI (US) 48118

( * ) Notice: Subject to any disclaimer, the term of this patent is extended or adjusted under 35 U.S.C. 154(b) by 0 days.

(21) Appl. No.: 09/333,090

(22) Filed: Jun. 15, 1999

Related U.S. Application Data

(63) Continuation of application No. 09/170,779, filed on Oct. 13, 1998, now Pat. No. 6,071,418.

(51) Int. Cl.$^7$ ................................................. C02F 1/78
(52) U.S. Cl. ..................... 210/760; 210/192; 210/205
(58) Field of Search ............................... 210/758, 760, 210/192, 198.1, 205; 261/120, 126

(56) References Cited

U.S. PATENT DOCUMENTS

| | | | |
|---|---|---|---|
| 3,810,548 A | 5/1974 | Blough | 210/242 |
| 4,076,617 A | * 2/1978 | Bybel et al. | 210/760 |
| 4,250,040 A | * 2/1981 | LaRaus | 210/760 |
| 4,645,603 A | 2/1987 | Frankl | 210/629 |
| 5,116,760 A | 5/1992 | Tanaka et al. | 435/290 |
| 5,599,451 A | 2/1997 | Guiot | 210/605 |
| 6,001,247 A | * 12/1999 | Schulz | 210/192 |
| 6,056,885 A | * 5/2000 | Wasinger | 210/760 |

* cited by examiner

*Primary Examiner*—Betsey Morrison Hoey
(74) *Attorney, Agent, or Firm*—Dinnin & Dunn P..C.

(57) ABSTRACT

A method and system for wastewater treatment is described and is particularly suitable for industrial lagoons and pits. Specifically, an ozone gas is homogeneously distributed through an upper stratum of a contained liquid thereby creating an aerobic "cap", while still maintaining an anaerobic lower stratum. A perforated tube or plurality of tubes fixed within the upper stratum serves to distribute the ozone. Alternately, a buoyant vehicle propelled across the surface of the liquid may also serve to distribute the ozone and create the ozonated "cap". The vehicle provides an additional benefit of crust fragmentation and prevention thereby inhibiting and eliminating fly propagation, and hygienically improving lagoon or pit operation. In either embodiment, the ability to create an aerobic and anaerobic balance within the liquid facilitates a reduction in odor, a significant improvement of organic digestion and solids control, and a reduction in pathogens sometimes found in water recycled from the containment area.

14 Claims, 2 Drawing Sheets

INDUSTRIAL LAGOON TREATMENT

The instant application is a continuation in part of U.S. application Ser. No. 09,170,779 entitled, "Manure Treatment System", filed on Oct. 13, 1998 and now U.S. Pat. No. 6,071,418, issued Jun. 6, 2000.

TECHNICAL ART

The instant invention generally relates to a purification and odor-control system for wastewater or liquid containment areas.

BACKGROUND OF THE INVENTION

Recent attention has focused on the need for environmental control in and around manure lagoons. Odors resulting from many manure lagoons and containment areas significantly detract from the use, enjoyment, and value of surrounding property. The formation of a manure crust seals the containment area thereby preventing natural aeration and contributing to an unbalanced anaerobic state. In fact, in colder climates, the formation of an ice cap over the crust acts to further seal the lagoon and creates a greenhouse effect. The spring thaw results in an acute and malodorous release of methane, hydrogen sulfide, and other gases. The formation of the crust also creates a breeding ground for flies, believed to be the primary disease vector from the farm to the surrounding community. Birds, in turn, often feed on the fly larvae and constitute a secondary disease vector. Crust formation also seals the lagoon from aerobic replenishment, and therefore contributes to an anaerobic state in the lagoon wherein odoriferous compounds are maximized. Finally, crust formation also inhibits slurry removal thereby contributing to an inoperable lagoon. The benefits of odor control and crust prevention thus become obvious.

Economic and political pressures are now encouraging the development of pig farms, in lieu of tobacco farms for example. Recent developments however, have restricted the design of new or expanding pig farms. Concerns such as odor, air quality, and ground and surface water quality, often implicating the Clean Water Act and/or the Clean Air Act, drive the restrictions.

In fact, a recent U.S. Senate study details the magnitude of environmental problems caused by animal waste. The findings indicate that the amount of animal manure produced annually is conservatively estimated to be 130 times greater than the amount of human waste produced. Stated another way, a 50,000 acre farm in Utah has been cited as potentially producing more waste than the entire city of Los Angeles. Other findings indicate that agricultural officials consider 60% of rivers and streams "impaired", with agricultural runoff the largest contributor to the pollution. Anecdotally, a 30,000 fish kill resulted from a weekend hog manure spill in Iowa. Efforts are therefore currently underway to impose national standards on livestock producers.

On a state level, certain areas such as North Carolina have enacted moratoriums on new or expanding hog farms. North Carolina has also granted counties zoning control over farms with more than 5,000 hogs. Industry experts warn that as more restrictions are placed on U.S. hog farms, pork production could move to other countries thereby damaging family farms and sending food profits overseas. The net result of further restrictions limits the land use and therefore detracts from the profitability of the farmland.

Aside from the private and public nuisance concerns, acute odors also indicate the potential for disease and reduced hog propagation due to respiratory problems, for example. In humans, even lower concentrations (100–300 parts per billion) of gases such as hydrogen sulfide are known to cause eye irritation, headaches, diarrhea, nausea, and an inability to sleep. Many of the gases, bacteria, viruses, spores, and worms found in manure contribute to a number of illnesses that may inhibit the full maturation of the swine, result in condemnation of all or part of the pig, and/or result in their premature deaths. In addition, many pathogens harmful to animals may also be harmful to workers. The swine flu and "farmer's lung" are illustrative. It is believed that insects and birds transfer these pathogens to the surrounding community.

In general, hog manure and urine contains or evolves into ammonia, hydrogen sulfide, methane, nitrates, trihalomethanes, spores of molds, and other contaminants. Research has shown that animal effluvia and the putrefactive gases resulting from animal and vegetable tissue are generally present in and around hog barns. Putrefaction produces highly odorous gases and compounds such as ammonia, amino acids, aromatic fatty acids, metabolites, mercaptans, indole, skatole, cresol, and alkaloid-like ptomaines such as tetramethylene-diamine and pentamethylene-diamine.

Several methods of storage and/or disposal include above-ground slurry storage, below-ground slurry storage, anaerobic lagoons with or without cover, aerated lagoons, oxidation ditches, and solid/liquid separation. Each method has its advantages and disadvantages.

Slurry storages are comparatively very costly, but the added cost is often the least risk option for farmers because slurry storages guard against mechanical and human failures that could result in environmental concerns. Straw covers are sometimes used in an effort to control odors. Other materials such as macadamia husks, cornstalks, plastic, peat moss, foam, and leka rock may also be used to cover the storage areas. The cost increases depending on the material. Additionally, temperature, humidity and light intensity can adversely effect the performance of biocovers such as straw and cornstalks. Covers may mask but do not eliminate the odors, however, and furthermore they do little, if anything, to eliminate or reduce the fly population.

A common misconception is that covers control odors. Covers actually promote poor lagoon health because there is little or no air for aerobic activity. Therefore, the odors associated with the liquid will actually increase over time. The anaerobic activity in a covered lagoon is increased for awhile, but in an unbalanced state (i.e. oxygen and aerobe deficient), the lagoon can quickly become unstable resulting in very poor organic treatment (i.e. solids buildup). Other problems associated with covered lagoons are confined explosive and toxic gases beneath the cover which must be vented, unhealthy recycle water (to the barn flushing system) that contains foul gases and higher pathogenic loads, and poor solids treatment capacity. Nevertheless, where covers are still desired, the disadvantages stated above drive improvements in the control of covered containment areas.

In the same way, odors, crust formation, and flies also plague anaerobic and aerobic lagoons open to the environment. Alternatively, the use of oxidation ditches and liquid/solid separation processes are significantly more costly as compared to other waste management methods.

Scientists have attempted to reduce odors from the annual spring runoff into the North Saskatchewan River at Edmonton, Alberta. The odors have been characterized as septic, manure, musty, earthy, and hay-like. Despite oxidative treatment, the odors persisted thereby supporting the scientists' belief of the futility of relying strictly on oxidative treatment. Other odor control methods have incorporated aeration with costly additives to control the odors.

Other efforts are underway to reduce or eliminate manure odors. For example, the University of Minnesota Agricultural Engineering department recently began a project to measure, chart, and record odors emitted from different livestock production sites around Minnesota. As one engineer states, there is currently very limited knowledge about the odor from hog production systems. The main thrust of the project is to develop a database to assist communities and pork producers in developing reasonable expectations about odor. At the national Center for Agricultural Utilization Research in Peoria, Ill., researchers sought one million dollars to attack the malodorous nature of manure. Other problems tabled for action include air and groundwater quality.

The use of ozone is well known as a disinfectant or sterilizing agent. In general, due to its disinfecting properties, ozone has not been considered a viable or feasible alternative when treating manure pits or lagoons. The conventional wisdom is that disinfection caused by the use of ozone would interfere with the microbiological balance required for organic digestion.

Description of the Related Art

The following references are herein incorporated by reference.

In the article entitled, "EVALUATION OF ODOUR REMOVAL BY PILOT-SCALE BIOLOGICAL TREATMENT PROCESS TRAINS DURING SPRING RUNOFF IN AN ICE-COVERED RIVER", Wat. Sci. Tech. Vol. 31, No. 11, pp. 195–201, (1995) S. E. Hrudley, P. M. Huck, M. J. Mitton, and S. L. Kenefick teach biological treatment of runoff water having a strong odor characterized as septic, manure, musty, earthy, and hay-like. Biological treatment using granular activated carbon can produce an essentially odor-free effluent during a transient raw-water odor event. On the other hand, for odor reduction the scientists teach the futility of relying on a strictly oxidative treatment such as ozone.

U.S. Pat. No. 3,960,718 to Lebo teaches the use of ozone as a sterilizing agent in sewage treatment.

U.S. Pat. No. 5,298,198 to LaCrosse teaches the purification of wastewater from a swine manure pond through an aerator at relatively low flow rates and pressures.

U.S. Pat. No. 3,884,804 to Robinson et al. teaches the use of "Contacogen" particles comprising solid catalyst portions having hydrophobic surface portions, wherein the particles are floated on the surface of a slurry of animal wastes. The particles promote the oxidation by air of the odoriferous compounds produced by the degenerative breakdown of the animal wastes.

U.S. Pat. No. 5,656,246 to Patapoff et al. teaches a wastewater treatment process incorporating ozone as a sterilizing agent, and oxidation technology. The waste must be transported to the reactor from the normal collection areas.

U.S. Pat. No. 5,053,140 to Hurst teaches a method for food process water purification utilizing ozonation. Ozone is clearly taught as destructive to bacteria.

U.S. Pat. No. 5,290,451 to Koster et al. teaches a liquid manure treatment process incorporating an aerated reactor, a denitrification reactor, a liquid/solid separator, and sedimentation tanks. The waste must be transferred to the process from the normal collection areas.

U.S. Pat. No. 5,616,163 to Halfter teaches a liquid manure treatment process incorporating aeration as a method of stripping odorous substances.

U.S. Pat. No. 5,053,140 to Hurst teaches a method for food process water purification utilizing ozonation.

Despite ongoing efforts, there is still a need for a cost-effective system that reduces or eliminates manure odors and if necessary, further prevents manure crust formation thereby eliminating a primary breeding ground for the insect/fly population. Given the moratorium on hog production due to ongoing environmental concerns, it becomes quite clear that methods of control such as simple aeration and/or covering the smell through covers or pit additives, for example, simply do not achieve the necessary odor and solids control required.

SUMMARY OF THE INVENTION

The aforementioned problems are solved by a liquid treatment system that ozonates an upper stratum of liquid contained in a liquid container. More specifically, an upper stratum of a liquid volume is preferably ozonated while maintaining anaerobic conditions in a lower stratum. This permits anaerobic digestion of manure waste, for example, while still eliminating the odoriferous gases through oxidation in the ozonated upper stratum.

Accordingly, an object of the present invention is to deodorize and oxidize odoriferous compounds within any given liquid in a liquid containment area.

Another object of the present invention is to deodorize the manure slurry within a liquid manure container such as a pit or lagoon.

Another object of the present invention is to eliminate or reduce the indigenous fly population around any liquid waste containment area.

Another object of the present invention is to deodorize and disinfect the air within a covered liquid containment area.

Yet another object of the present invention is to prevent manure crust formation in a manure lagoon and eliminate a fly breeding ground, thereby further eliminating a primary disease vector from the farm to the community.

In accordance with these and other objects, the present invention oxidizes gases naturally associated and produced with aqueous and/or oily/fatty liquid wastes, and also those gases resulting from the bacteriological breakdown of the wastes. The injection of ozone into the contaminated fluids deodorizes and disinfects thereby effectively controlling the odors emitted therefrom.

In a first embodiment, a perforated tube or plurality of perforated tubes extends across a lagoon within an upper portion of the total volume, most preferably in the upper fourth portion of the total volume. When ozone is pumped into the perforated tubing, the gas is evenly dispersed through an upper portion of the liquid that approximates one fourth of the total volume. The odoriferous gases thus contact the ozone and are oxidized prior to their release into the atmosphere.

In a second embodiment, the first embodiment described above may also contain a cover, polymeric for example, over the liquid container. A perforated tube or a perforated plurality of tubes may then, if desired, be extended above the liquid container but within the air-gap of the covered area, thereby further oxidizing any odoriferous gases that may have escaped the ongoing slurry oxidative treatment.

In a third embodiment, a buoyant vehicle is randomly preferably propelled across the surface of the liquid by electrical propulsion. A preferred embodiment contains an electrically actuated pump thereby providing a propulsion means for propelling the vehicle across the surface of the lagoon. Ozone is diffused into the slurry by way of a gas injector. The ozone and electrical power are preferably introduced at or near the bottom of the lagoon or pit. Ozone functions as a powerful oxidant that virtually eliminates the odors by maintaining an aerobic/anaerobic balance in the manure slurry. The random movement of the buoyant vehicle creates an ozonated "cap" or oxidation zone in about the upper quarter of the slurry container, thereby eliminating the odor causing gases prior to their release into the atmosphere. Concurrently, an anaerobic state persists below the "cap" thereby permitting anaerobic digestion of the manure. The vehicle is also heavy enough to fragment any floating masses of crust that typically form in manure lagoons, for example, and ice thereby eliminating the fly breeding ground and also further inhibiting an anaerobic state and acute odors in the liquid. If a cover is desired, ozonation of the resultant air-gap over the liquid container may be accomplished as described in the second embodiment.

DETAILED DESCRIPTION OF THE PREFERRED EMBODIMENT(S)

Figure 1:
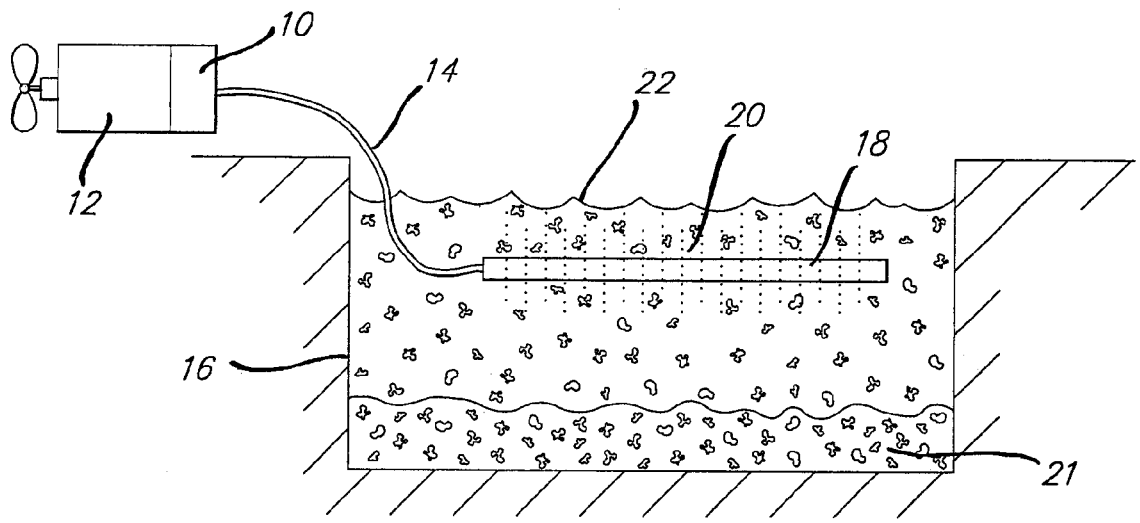
FIG. 1 illustrates a first embodiment in accordance with the present invention.

In a first embodiment shown in FIG. 1, a gas generator 10 contains a pump 12 fluidly communicating with an airtight tube or plurality of tubes 14. The generator 10 is housed next to a liquid container 16 such as a manure lagoon or pit. Airtight tubes 14 fluidly communicate with a perforated tube or plurality of perforated tubes 18. As shown in FIG. 1, tubes 18 extend into the manure lagoon wherein holes within the tube(s) are preferably but not necessarily spaced one inch apart and thus facilitate an even percolation of ozone into the slurry. An ozone gas is produced by generator 10 and is transferred by pump 12 through airtight tube(s) 14 into the perforated tube or plurality of perforated tubes 18. In accordance with the present invention, ozone is supplied to the liquid within the cap 20 at about 0.1 to 1 milligrams of ozone per gallon of manure slurry per day (steady state), although startup and makeup rates may be greater. As shown in FIG. 1, a lower anaerobic stratum 21 is maintained in at least the lower half of the containment area 16.

For example, the upper fourth of a 10-foot deep lagoon extends 2.5 feet down from the surface 22. This represents the treated "cap" 20, or in an untreated lagoon, a less turbid fluid based on sedimentation. For a lagoon consisting of approximately one million gallons, 250,000 gallons would be pumped at a rate of about 173.6 gallons/minute. Taking the ozone mass flow rate given above at 0.1–1 mg/gallon of slurry per day, the range of ozone generally required would be about 17.36–173.6 milligrams/minute. In essence, a one million-gallon manure pit would require about 25–1000 grams of ozone per day depending on the bacterial breakdown of the manure. As the bacterial activity increases, odoriferous gases such as hydrogen sulfide, ammonia, and methane are produced. Greater concentrations of bacteria, due to factors such as nutrient rich manure and increased temperature, will require greater concentrations of ozone to control the resulting odor and oxidize undesirable gases.

Figure 3:
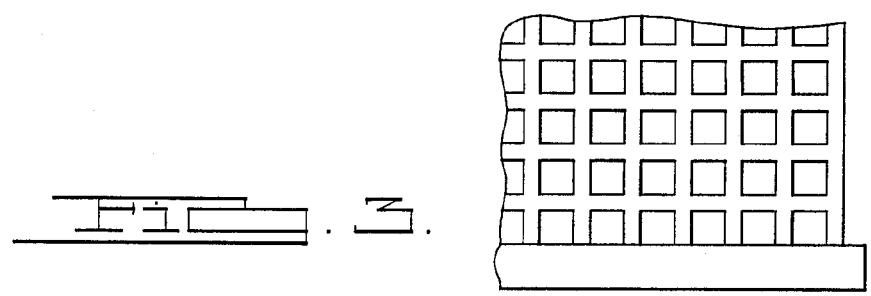
FIG. 3 illustrates a plurality of perforated tubes forming a grid.

The perforated tubes 18 are preferably arranged either in a grid network, as shown in FIG. 3, or in a plurality of horizontally parallel sections at one to two feet below the surface of the liquid. Each tubing 18 is preferably spaced 10 to 15 feet from other parallel sections in either the grid or parallel orientation. The "cap" 20, or upper stratum of treated liquid, is formed about the tubing 18 as a steady stream of stratified ozone reacts with the pollutants rising through the pit. The ozone bubbled into the liquid quickly reacts with gases such as hydrogen sulfide, mercaptans, methane, carbon monoxide, and other organic matter, and also functions as a disinfectant.

The temperature of the manure and the concentration of the waste gases will affect the residence time of the ozone. As the temperature decreases, the reaction time slows and the residence time of the ozone is increased. Conversely, the residence time is decreased as the temperature and reaction rate increase. In general, depending on the reaction conditions described above, the residence time of the ozone is believed to be between 0–5 minutes.

Figure 2:
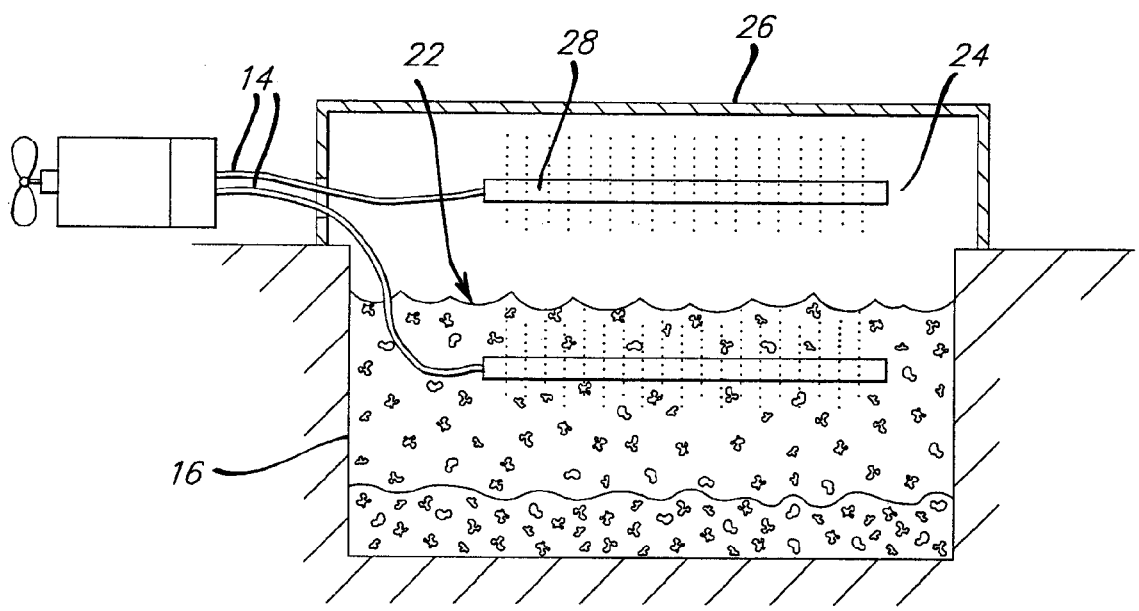
FIG. 2 illustrates a second embodiment in accordance with the present invention.

In a second closely related embodiment shown in FIG. 2, the lagoon or pit 16 is covered, and in the same way ozone is dispersed into the lagoon at 0.1–1 mg per gallon per day. Airtight tubes 14 also disperse ozone into an air gap 24 existing between the cover 26 and the surface of the liquid 22. A second perforated tube or plurality of perforated tubes 28 extends within the air-gap 24. At steady state, the ozone comprises 0.02–0.1 parts per million (ppm) in the air, although the ozone may be introduced in greater concentrations during start-up and make-up conditions. Again, the tubes 28 are preferably arranged in a grid network as shown in FIG. 3.

Figure 4:
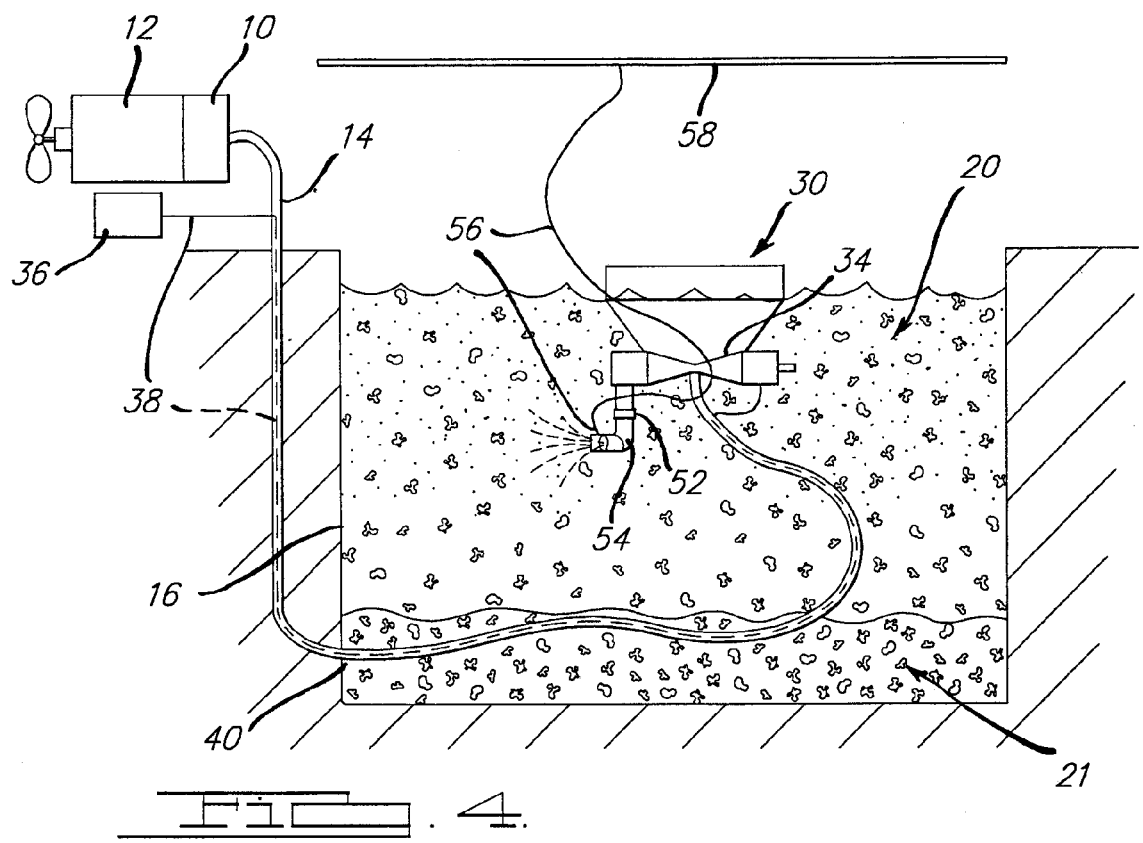
FIG. 4 illustrates a third embodiment in accordance with the present invention, wherein the buoyant vehicle shown not only ozonates the liquid containment area, but also fragments any crust tending to form on the surface of the slurry.
Figure 5:
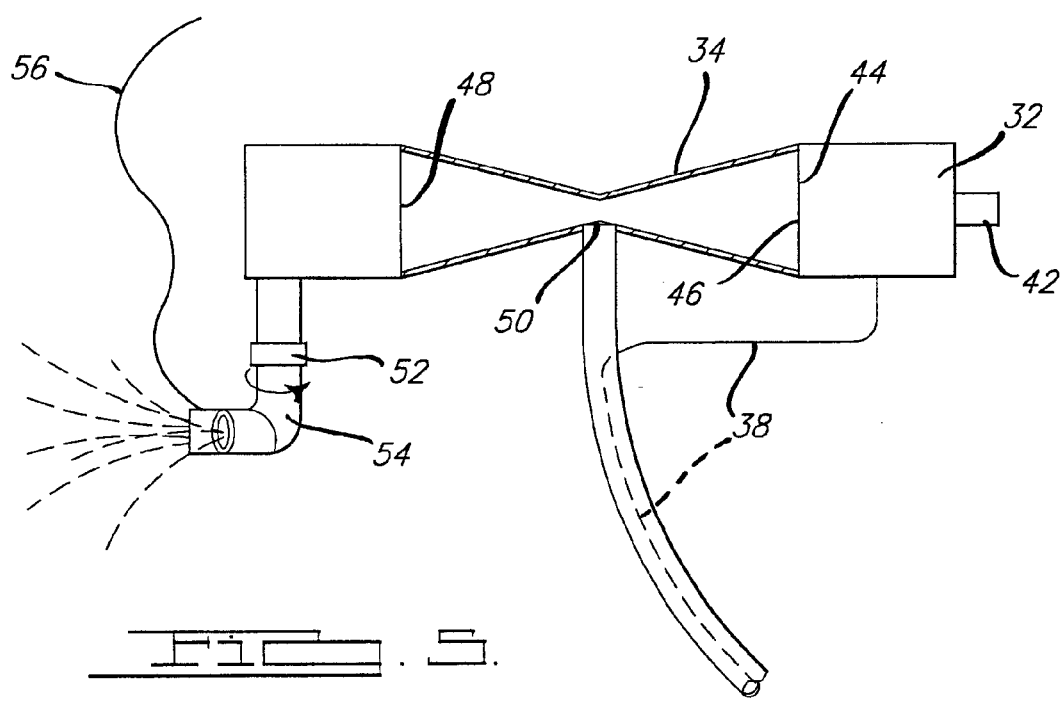
FIG. 5 illustrates a gas injector and a propulsion manifold employed in the third embodiment in accordance with the present invention.

In a third embodiment shown in FIG. 4, ozone produced by generator 10 is transferred by pump 12 through an insulated and airtight tube or plurality of tubes 14 to a buoyant vehicle 30. Additionally, as shown in FIGS. 4 and 5, the vehicle 30 contains a pump 32 and a gas injector 34 wherein the injector 34 is commercially available and sold by, for example, Mazzei Injector Corporation located in Bakersfield, Calif. An electrical source 36 preferably actuates pump 32. As shown in FIGS. 4 and 5, an electrical line 38 supplies pump 32 with electrical power from source 36. In accordance with the present invention, insulated and airtight tube 14 not only transfers ozone to injector 34, but also encloses the electrical line 38 thereby facilitating a safe transfer of electrical power. As further shown in FIG. 4, the electric power in line 38 and the ozone transferred from generator 10, both contained within the insulated and airtight tube(s) 14, are preferably introduced through an insulated port 40 near or at the bottom of the lagoon or pit 16.

In accordance with the present invention and as shown in FIG. 5, the pump 32 contains an inlet port 42 in fluid communication with an outlet port 44. Injector 34 contains a liquid inlet port 46 fluidly communicating with pump outlet port 44, a liquid outlet port 48 fluidly communicating with liquid inlet port 46, and a gas inlet port 50 fluidly communicating with injector ports 46 and 48. A union 52 rotatably connects the liquid outlet port 48 of the gas injector 34 with the propulsion manifold 54 of vehicle 30. The propulsion manifold 54 is preferably bifurcated into two or more propulsion tubes at acute angles from one another. As the vehicle 30 is propelled across the surface 20 to either end of the container 16, the bifurcated propulsion manifold 54 exerts a bias on the rotatable union 42. The propulsion direction as shown in FIGS. 4 and 5 can thus be randomly varied without changing the general orientation of the vehicle 30. The bifurcated and rotatable propulsion manifold 54 thus prevents kinks in the airtight and insulated ozone/electric tube(s) 14 and yet still facilitates migration of the vehicle 30 throughout the lagoon or pit 16.

A guideline 56, connected to a control line 58 extending above or below (not shown) the container 16, is also connected to the rotatable propulsion manifold 54. Movement of the vehicle 30 is thereby constrained to just within the periphery of the lagoon or pit 16. The vehicle 30 is preferably constructed from corrosion resistant materials such as stainless steel, fiberglass, or treated wood.

Vehicle 30 is thereby electrically propelled by pump 32 across the surface of the liquid 20 within the container 16. The random movement of the vehicle 30 not only serves to distribute the ozone across the lagoon or pit 16, but also agitates and mixes the ozone into the liquid thereby ensuring a homogeneous ozone dispersion within the resultant water cap 16. One of ordinary skill in the art will readily appreciate that other methods of propulsion may also be used.

In each embodiment, the effectiveness of the ozone may be improved simply through on-site filtration of the liquid within the container 16. Flocculation, sedimentation, and other well-known filtration and separation techniques are effective in reducing the total suspended solids. Ozone may be produced, for example, by ultraviolet lighting or by cathode ray tubes. Ozone generators are commercially available, for example, from Fuller Ultraviolet Corporation in Frankfort, Illinois. Due to maintenance ease, ultraviolet ozone generation is preferred.

Table 1 indicates various characteristics of a manure slurry within a lagoon or pit operating under ozonated steady state conditions as described above. Sample 1 was taken shortly after steady state conditions were achieved. Sample 2 was taken about a month afterwards and illustrates the stability of the lagoon over an extended period of time. All tests were conducted based on methods documented in *Standard Methods for the Examination of Water and Wastewater*, 14$^{th}$ Edition (1975) and 15$^{th}$ Edition (1980), *Washington D.C. American Public Health Association, Inc.*, the teachings of which are herein incorporated by reference.

TABLE 1

| Sample and Characteristic | Influent Pipe | Surface Bank | 1 Foot Depth Top | 2–3 Foot Depth Midpoint | 5 Foot to Bottom |
|---|---|---|---|---|---|
| Sample 1: NH3 nitrogen (mg/L) | 376 | 372 | 380 | 424 | 528 |
| Sample 2: NH3 nitrogen (mg/L) | 500 | 331 | 337 | 336 | 296 |

TABLE 1-continued

| Sample and Characteristic | Influent Pipe | Surface Bank | 1 Foot Depth Top | 2–3 Foot Depth Midpoint | 5 Foot to Bottom |
|---|---|---|---|---|---|
| Sample 1: BOD (mg/L) | 943 | 420 | NA | 360 | 360 |
| Sample 2: BOD (mg/L) | 541 | 122 | 120 | 143 | 217 |
| Sample 1: COD (mg/L) | 3222 | 1272 | 1016 | 1121 | 31936 |
| Sample 2: COD (mg/L) | 1908 | 753 | 644 | 803 | 1724 |
| Sample 1: TDS (mg/L) | 1360 | 1190 | 1240 | 1440 | 1330 |
| Sample 2: TDS (mg/L) | 1603 | 1050 | 1083 | 1113 | 1077 |
| Sample 1: pH | 7.41 | 7.45 | 7.55 | 7.82 | 7.38 |
| Sample 2: pH | 7.482 | 7.798 | 7.490 | 7.827 | 7.785 |
| Sample 1: Odor Average | 2.33 | 1.167 | 1.5 | 0.67 | 1.33 |
| Sample 1: Odor Std. Dev. | 0.52 | 0.169 | 1.38 | 0.52 | 0.52 |
| Sample 2: Odor Average | 3 | 0.167 | 0.167 | 0.333 | 0.333 |
| Sample 2: Odor Std. Dev. | 0 | 0.406 | 0.408 | 0.516 | 0.816 |
| Sample 1: Anaerobic Bac. Ave. Counts | $5.86 \times 10^6$ | $1.93 \times 10^6$ | $1.57 \times 10^6$ | $1.97 \times 10^6$ | $2.47 \times 10^6$ |
| Sample 1: Anaerobic Bac. Std. Dev. | $2.05 \times 10^6$ | $7.5 \times 10^5$ | $3.21 \times 10^5$ | $1.53 \times 10^5$ | $8.39 \times 10^5$ |
| Sample 2: Anaerobic Bac. Ave. Counts | $6.3 \times 10^6$ | $4.1 \times 10^5$ | $2.7 \times 10^5$ | $3.4 \times 10^5$ | $6.3 \times 10^5$ |
| Sample 2: Anaerobic Bac. Std. Dev. | $0.3 \times 10^6$ | $1.2 \times 10^5$ | $0.21 \times 10^5$ | $0.68 \times 10^5$ | $2.2 \times 10^6$ |
| Sample 1: Tot. Coliform Ave. MPN | $1.12 \times 10^6$ | $3.6 \times 10^4$ | $8.54 \times 10^5$ | $2.97 \times 10^4$ | $1.25 \times 10^4$ |
| Sample 1: Tot. Coliform Std. Dev. | $3.29 \times 10^5$ | $1.15 \times 10^4$ | $1.34 \times 10^6$ | $1.15 \times 10^4$ | $1.02 \times 10^4$ |
| Sample 2: Tot. Coliform Ave. MPN | $0.3 \times 10^6$ | $1.2 \times 10^5$ | $0.21 \times 10^5$ | $0.68 \times 10^5$ | $2.2 \times 10^6$ |
| Sample 2: Tot. Coliform Std. Dev. | $0.46 \times 10^5$ | NA | NA | $1.1 \times 10^5$ | $0.13 \times 10^5$ |

As shown in Table 1, the anaerobic and aerobic bacteria populations remain balanced with respect to each other throughout the month from Sample 1 to Sample 2. Additionally, the BOD data (biological oxidation demand)

indicates a lower biological oxygen demand once the manure slurry leaves the influent pipe into the lagoon. In general, as the biological oxygen demand is reduced, the aerobic bacteria increase. This is, in addition to the bacterial counts given above, indicative of a balanced lagoon that results in optimum digestion and treatment of the manure. When the BOD increases, the anaerobic population remains, while the aerobic population is reduced. The outcome is inefficient digestion and poor organic breakdown. This of course leads to acute and volatile odoriferous compounds resulting from a dominant anaerobic activity. In fact, conventional wisdom recognizes that anaerobes in and of themselves digest organic material very slowly or constitute a "stuck digester", remaining in the acid generating mode. Aerobes, on the other hand, operate in a basic or neutral generating mode and thereby balance the acid produced by the anaerobes. The result of a balanced lagoon containing operable amounts of anaerobes and aerobes as shown in Table 1 (but not thereby limited) is thus a three-fold increase in the breakdown or digestion of organic matter. As shown in Table 1, the uniform pH values, the uniform values of total dissolved solids (TDS), and the consistent coliform counts throughout the lagoon or pit depth, corroborate this theoretical understanding.

The chemical oxygen demand (COD) of Table 1 clearly shows that at upper depths of the container the COD is respectively much lower than at the lower depths. This indicates formation of the aerobic and anaerobic strata as explained above.

Six panelists trained in olfactory testing evaluated samples from various depths and rated the respective odors on a scale from 0–3 where 0=not offensive, 1=mildly offensive, 2=strongly offensive, and 3=very strongly offensive. As shown in both the Sample 1 group and the Sample 2 group, the odors of the manure containment area were significantly if not almost completely reduced as compared to the odor of the manure flowing through the influent pipe (i.e. not treated).

Thus a healthy lagoon, also known as a facultative lagoon, is designed to have both an aerobic metabolic zone and a healthy anaerobic metabolic zone. When healthy, it is believed that the anaerobic zone produces methane and carbon dioxide from a two-step fermentative pathway. Sugars, fats, and/or proteins are first degraded via acid fermentation to acetic acid and excess reducing power (NADH). Acetic acid is cleaved into methane and carbon dioxide by a second group of fermentative organisms. Excess reducing power from acid production is used to make methane from carbon dioxide. Destruction of acids and volatilization of $CO_2$ keep the pH balanced (pH>6.7). Sulfate and nitrates are used as respiratory electron acceptors to produce hydrogen sulfide and nitrogen gas. The healthy aerobic zone "caps" the anaerobic zone. Untreated acids, ammonia, and hydrogen sulfide released to the aerobic zone from the anaerobic zone are quickly oxidized in the oxygen rich environment. The oxygen concentration of the aerobic zone should be greater than 1.0 ppm. The total loading to an odor free lagoon should be less than 20–50 pounds BOD/Acre-day. Settlable solids are degraded rapidly and the lagoons therefore seldom need dredging.

In contrast, unhealthy pig lagoon loadings are extremely high (>500 pounds BOD/acre-day). This likely results in a classic collapse of the methane generation ecology. Methane generating bacteria proliferate much more slowly than acid fermenting bacteria. It is believed that when overloaded with BOD, the acid generation outstrips both the methane generation capacity and the natural buffering capacity of the slurry. As the pH drops below 6.3, methane generation rapidly diminishes, and acetate concentrations reach toxic levels to the methane generators. The fermentation capacity of the acid generators also slows down, due to a build-up of excess reducing power (NADH) and no suitable electron acceptor. Therefore, the acid generation pathways become "bogged" down or "stuck" leaving toxic compounds such as caproic, valeric, and butyric acids. The pH stabilizes at about 5.0. Very little destruction of solids occurs. Undigested matter infuses the top waters of the lagoon, overwhelming the oxygen transfer capacity of the lagoon surface. The top waters of the lagoon thus become anaerobic resulting in a complete anaerobic ecology.

Certain changes caused by ozonation in a liquid containment area are believed to occur very rapidly. For example, preferential destruction of aromatics and hydrogen sulfide (toxins), agitation and disbursement of the floating scum layer, neutralization of acids, and precipitation of colloids all occur rapidly in a newly ozonated lagoon. In the next few weeks, it is believed that a unique ecology is established within the lagoon wherein the top waters clear and become an ecological niche for micro-aerophiles, and, a population of pigmented (non-sulfur purple) photoautotrophic bacteria (rhodobacterium) increasingly multiply to become the predominant micro-aerophile. These organisms are highly efficient in the microphillic environment, easily switching from fermentation to respiration to photosynthetic destruction of volatile acids. Thus, the top waters of the anaerobic lagoon are thought to behave much like a fully aerobic top layer in a facultative lagoon. Once the micro-aerophilic zone is functional, then a natural "sink" for the toxic anaerobic acids occurs, and the acid content of the anaerobic zone stabilizes. Methane generators are thus no longer overwhelmed thereby increasing the activity in the anaerobic zone.

Thus, it is thought that ozonation restores the health of a lagoon system by rapidly establishing and maintaining environmental conditions favored by non-sulfur purple bacteria. This then drives the recovery of both the top water and the anaerobic sludge zone in the lagoon.

Additional data established by gas chromatography, and not shown in Table 1 indicates that ozone reduces the volatile phenols, cresol, and skatole. After treatment with ozone: phenols were reduced from 48 mg/L to 12 mg/L; ethyl phenol was reduced from 4.9 mg/L to 1.2 mg/L; cresol was reduced from 146 mg/L to 1.8 mg/L; and skatole was reduced from 2.6 mg/L to 0 mg/L. As evaluated by the purge and trap method, hydrogen sulfide was reduced from 21.0 mg/L to 11.0 mg/L after ozone treatment. The reduction of these odoriferous compounds parallels the odor tests and other data exhibited in Table 1.

The present invention is certainly not limited to treatment of manure slurries, however. As exemplified by the data provided in Table 2, the basic chemistry described above will facilitate treatment of any liquid requiring a breakdown of fats, sugars, and/or proteins, or any other primary compound that degrades into secondary oxidizable compounds. Stated another way, the basic chemistry facilitates treatment of any liquid waste slurry that liberates carbon dioxide, methane, ammonia, mercaptans, and/or any other oxidizable compound in solution. One of ordinary skill in the art will readily appreciate the breadth of the present invention based on the number of wastes that naturally or otherwise break down into oxidizable constituents when confined in a liquid volume.

Table 2 indicates various characteristics of a slurry within a lagoon or pit operating under ozonated steady state conditions as described above. The slurry contains wastes resulting from various processes in a fat and protein rendering plant that includes processing chickens. Sample 3 was taken prior to ozonation. Sample 4 was taken twenty days after ozonation and illustrates the stability of the lagoon over an extended period of time. All tests were again conducted based on methods documented in *Standard Methods for the Examination of Water and Wastewater*, 14$^{th}$ Edition (1975) and 15$^{th}$ Edition (1980) *Washington DC: American Public Health Association, Inc.*

TABLE 2

| Sample and Characteristic | Influent Pipe | Surface Bank | 1 Foot Depth Top | 2–3 Foot Depth Midpoint | 5 Foot to Bottom |
| --- | --- | --- | --- | --- | --- |
| Sample 3: NH3 nitrogen (mg/L) | 148 | 155 | 163 | 316 | 388 |
| Sample 4: NH3 nitrogen (mg/L) | 166 | 103 | 98 | 111 | 123 |
| Sample 3: BOD (mg/L) | 880 | 360 | NA | 410 | 520 |
| Sample 4: BOD (mg/L) | 920 | 210 | 198 | 202 | 226 |
| Sample 3: COD (mg/L) | 5663 | 4871 | 3655 | 3811 | 9620 |
| Sample 4: COD (mg/L) | 4803 | 2080 | 1827 | 2118 | 2306 |
| Sample 3: TDS (mg/L) | 2106 | 1992 | 1840 | 1738 | 1811 |
| Sample 4: TDS (mg/L) | 3043 | 1281 | 1327 | 1285 | 1107 |
| Sample 3: PH | 6.3 | 6.4 | 6.6 | 5.8 | 6.1 |
| Sample 4: PH | 6.5 | 6.8 | 6.9 | 6.7 | 6.7 |
| Sample 3: Odor Average | 2.91 | 1.86 | 2.06 | 1.71 | 1.96 |
| Sample 3: Odor Std. Dev. | 0.46 | 0.72 | 0.83 | 0.66 | 0.86 |
| Sample 4: Odor Average | 2.88 | 0.6 | 0.6 | 0.8 | 1.3 |
| Sample 4: Odor Std. Dev. | 0.3 | 0.7 | 0.7 | 0.6 | 0.7 |
| Sample 3: Anaerobic Bac. Ave. Counts | $2.66 \times 10^2$ | $2.02 \times 10^3$ | $1.36 \times 10^4$ | $1.54 \times 10^4$ | $1.33 \times 10^4$ |
| Sample 3: Anaerobic Bac. Std. Dev. | $0.83 \times 10^2$ | $1.1 \times 10^3$ | $9.3 \times 10^2$ | $7.2 \times 10^2$ | $1.7 \times 10^2$ |
| Sample 4: Anaerobic Bac. Ave. Counts | $7.3 \times 10^2$ | $10.1 \times 10^2$ | $3.6 \times 10^2$ | $6.3 \times 10^2$ | $4.4 \times 10^2$ |
| Sample 4: Anaerobic Bac. Std. Dev. | $0.58 \times 10^2$ | $3 \times 10^2$ | $0.86 \times 10^2$ | $2.7 \times 10^2$ | $1.1 \times 10^2$ |
| Sample 3: Tot. Coliform Ave. MPN | $1.12 \times 10^6$ | $3.6 \times 10^4$ | $8.54 \times 10^5$ | $2.97 \times 10^4$ | $1.25 \times 10^4$ |
| Sample 3: Tot. Coliform Std. Dev. | $3.29 \times 10^5$ | $1.15 \times 10^4$ | $1.34 \times 10^6$ | $1.15 \times 10^4$ | $1.02 \times 10^4$ |
| Sample 4: Tot. Coliform Ave. MPN | $2.8 \times 10^2$ | $0.6 \times 10^2$ | $0.3 \times 10^2$ | $0.8 \times 10^2$ | $0.3 \times 10^3$ |
| Sample 4: Tot. Coliform Std. Dev. | $0.36 \times 10^2$ | $0.8 \times 10$ | $7.2 \times 10$ | $1.3 \times 10$ | $7.7 \times 10$ |

The data shown in Table 2 is roughly equivalent to the data shown in Table 1 and can be interpreted in the same way. Note especially the reduction in ammonia from the bottom layer to the upper foot. Also note the corresponding reduction in odor from the bottom to the upper foot in the containment area. It should additionally be noted that the anaerobic bacteria counts appear to support the theory of the non-sulfur purple bacteria (rhodobacterium) as establishing a "pseudo-facultative" lagoon.

It has been unexpectedly discovered that the ozone levels applied in accordance with the present invention also contribute to a reduction in the fly population. It is believed that ozone retards maturation of the fly larvae thereby affecting a decrease in the population. Fly counts before and after ozonation show a marked reduction in the number of flies surrounding the manure treatment area.

Finally, one of the common misconceptions of ozone addition to a lagoon system is that ozone will deplete the bacteria and cause sterility of the pond, thereby inhibiting organic digestion. As shown in Tables 1 and 2, the bacterial populations are not eliminated or significantly reduced over time. Rather, the ozone levels applied eliminate the odors but are not high enough to affect the overall bacterial load within the contained liquid. On a small scale, however, it is believed that the ozone helps to reduce the pathogen load in the recycle water drawn from the lagoon or pit. This is largely due to the fact that outside of a living host, pathogens are at a huge ecological disadvantage compared to the desirable bacteria. Since the healthy bacteria readily propagate in a healthy lagoon or pit, and the pathogens cannot, a little ozone is also beneficial in this regard.

In sum, mechanical agitation and aeration due to ozone addition act to stimulate the aerobic activity of the lagoon or pit. Ozonation of lagoon top waters has an effect on lagoon dynamics that creates the conditions whereby the anaerobic sector of the lagoon begins to work effectively. The outcome is cleaner and safer recycle water, a further reduction in odor, and a more aggressive solids control within the lagoon or pit, far exceeding expectations based solely on the stoichiometry of the ozone additions. Stated another way, the system acts synergistically to improve the health and the aesthetics of the liquid containment area and the surrounding area.

Ozone has been found to efficiently establish a healthy lagoon balance thereby resulting in the benefits described above. Compared to other oxygenating gases, ozone is unique in that it consists entirely of oxygen and it also exhibits disinfecting as well as deodorizing properties.

While the preferred embodiments have been disclosed, one of ordinary skill in the art will readily appreciate that the invention is susceptible of modification without departing from the scope of the following claims.

I claim:

1. A liquid treatment system comprising:

a liquid container comprising a liquid volume having a surface extending across the entire liquid container; and a dispersal system for dispersing an ozone gas, said system in fluid communication with said liquid container wherein said dispersal system creates an upper ozonated stratum in said liquid volume coextensive with the surface thereof, and, said dispersal system maintains an anaerobic stratum below said ozonated stratum.

2. A liquid treatment system comprising:

a container comprising a liquid volume;

a buoyant vehicle;

a liquid pump secured to said vehicle for propelling said vehicle across said liquid volume, said pump comprising an inlet port and an outlet port, said outlet port in fluid communication with said inlet port;

a gas injector in fluid communication with said outlet port, said injector comprising a liquid inlet port, a liquid outlet port in fluid communication with said liquid inlet port, and a gas injection port;

an ozone gas generator in fluid communication with said gas injection port; and a propulsion manifold rotatably and fluidly communicating with said liquid outlet port, said propulsion manifold comprising one or more propulsion outlet ports for propelling said vehicle.

3. The system of claim 2 further comprising:

a control wire extending above and across said liquid container; and a guideline slidably connected to said control wire and secured to said propulsion manifold.

4. The system of claim 2 further comprising:

a control wire extending below said vehicle and across said liquid container; and a guideline slidably connected to said control wire and secured to said propulsion manifold.

5. The system of claim 2 wherein said vehicle has at least one tapered end.

6. The system of claim 2 further comprising:

a cover extending above said container wherein a gap comprising air exists between said cover and said container; and one or more perforated tubes extending across said gap, wherein said ozone generator fluidly communicates with said one or more perforated tubes extending across said gap.

7. A liquid treatment system comprising:

a container comprising a liquid volume;

one or more perforated tubes extending across said container and fixed within an upper portion of the liquid volume;

an ozone gas generator in fluid communication with said one or more perforated tubes, a cover extending above said container wherein a gap comprising air exists between said cover and said container; and one or more perforated tubes extending across said gap, wherein said ozone generator fluidly communicates with said one or more perforated tubes extending across said gap.

8. A method for treating liquid within a container comprising the steps of:

ozonating an upper stratum of a liquid volume within the container, said liquid volume having a surface extending across the entire container, wherein said upper stratum is coextensive with the surface of the liquid volume; and maintaining an anaerobic stratum of the liquid volume below the upper stratum.

9. The method of claim 8 wherein ozonating the upper stratum further comprises:

pumping the liquid through a pump secured to a buoyant vehicle;

injecting ozone gas into the outlet stream of the pump; and propelling the buoyant vehicle across the liquid container.

10. The method of claim 9 wherein ozone is supplied at about 0.1 through 1.0 milligrams per gallon of treated liquid volume per day.

11. The method of claim 8 wherein ozonating the upper stratum further comprises:

injecting ozone gas into one or more perforated tubes wherein the tube(s) extend across the container and within the upper stratum.

12. The method of claim 11 wherein ozone is supplied at about 0.1 through 1.0 milligrams per gallon of treated liquid volume per day.

13. The method of claim 11 wherein the container is covered thereby creating a covered gap comprising air and existing above the liquid in the container, said method further comprising:

injecting ozone gas into one or more perforated tubes extending across the gap.

14. The method of claim 13 wherein ozone is supplied to the gap at about 0.02 to 0.1 parts per million.

* * * * *